United States Patent [19]

Theret et al.

[11] Patent Number: 5,201,137
[45] Date of Patent: Apr. 13, 1993

[54] HYDRODYNAMIC TRAWL OPENING DEVICE

[75] Inventors: Francois Theret, Lorient; Hervé Guigo, Caudan; Bernard Kerrest, Brest, all of France

[73] Assignee: Institut Francais de Research pour l'Exploitation de la Mer, Issy-Les-Moulineaux, France

[21] Appl. No.: 659,421

[22] PCT Filed: Jul. 18, 1990

[86] PCT No.: PCT/FR89/00541

§ 371 Date: Jun. 3, 1991

§ 102(e) Date: Jun. 3, 1991

[87] PCT Pub. No.: WO91/01633

PCT Pub. Date: Feb. 21, 1991

[30] Foreign Application Priority Data

Aug. 9, 1989 [FR] France .................. 89 10860

[51] Int. Cl.⁵ .................................... A01K 73/04
[52] U.S. Cl. .................................................. 43/9.7
[58] Field of Search ...................................... 43/9.7

[56] References Cited

U.S. PATENT DOCUMENTS 3,299,560  1/1967  Luketa .................... 43/9.7

FOREIGN PATENT DOCUMENTS

| | | | |
|---|---|---|---|
| 0146027 | 4/1952 | Australia | 43/9.7 |
| 561333 | 1/1923 | France . | |
| 0670516 | 11/1929 | France | 43/9.7 |
| 1189592 | 1/1958 | France . | |
| 1245612 | 9/1959 | France . | |
| 0303964 | 5/1971 | U.S.S.R. | 43/9.7 |
| 0549120 | 3/1977 | U.S.S.R. | 43/9.7 |
| 0561544 | 6/1977 | U.S.S.R. | 43/9.7 |
| 0782783 | 11/1980 | U.S.S.R. | 43/9.7 |
| 1072850 | 2/1984 | U.S.S.R. | 43/9.7 |
| 1402316 | 6/1988 | U.S.S.R. | 43/9.7 |
| 0265820 | 2/1927 | United Kingdom | 43/9.7 |
| 305287 | 2/1929 | United Kingdom . | |
| 352892 | 7/1931 | United Kingdom . | |
| 360808 | 11/1931 | United Kingdom . | |
| 674911 | 3/1950 | United Kingdom . | |

*Primary Examiner*—Kurt C. Rowan
*Attorney, Agent, or Firm*—Roland Plottel

[57] ABSTRACT

A hydrodynamic trawl opening device is disclosed consisting of a structure (11) with at least two flexible superimposed wings (12, 13), joined together by a plurality of flexible dividing walls (14) which are transverse with respect to said wings. Fixing means (15a, 15b) are further provided for rigging it to the trawl, close to the opening, so that the wings are incident with respect to the flow direction and so that said dividing walls are oriented in the flow direction.

Besides its excellent lift performances at normal trawling speeds, the device of the invention is very easy to rig and has negligible space requirement.

16 Claims, 5 Drawing Sheets

HYDRODYNAMIC TRAWL OPENING DEVICE

The present invention relates to a hydrodynamic device, more particularly for bottom trawls, for ensuring satisfactory opening thereof, whatever the trawling speed.

A traditional bottom trawl, such as shown schematically in FIG. 1 of the accompanying drawings, comprises a pocket 1 whose opening is bordered on the lower side by a weighted pad 2 dragging on the bottom, on the upper side by a back rope 3 to which floats are attached and on the sides by extensions of the net or wings 4. The rigging of the trawl comprises on each side a lower rope 5a and an upper rope 5b attached respectively to a low point (end of pad 2) and a top point (end of the back rope 3) of a wing 4. The other ends of ropes 5a and 5b are joined together, and their junction is connected to a divergent panel 6 by an arm 7, the panel 6 being itself connected to the boat by a trawl warp 8. A portion of net 9 adjacent the back rope 3 and situated in the centre is called "back square".

The purpose of said floats (not shown) attached to the back rope 3 is to raise the latter and provide vertical opening of the trawl. As shown in FIG. 1, the upper part of the pocket is then incident so that, when moving, the play of the forces at the level of the back rope 3 is such as shown by the diagram of FIG. 2 where f is the buoyancy of the floats, t their drag, R the trawling force (via the upper and lower ropes) on the back rope and T the pull exerted thereon by the net.

Of course, T, t and R are increasing functions of the speed so that when the speed increases, angle $a$ decreases, which results in flattening of the trawl and so a reduction in height of the opening, the vertical opening force (buoyancy f of the floats) being constant.

Now, for good efficiency of the trawl, the stability of the shape of its mouth is determinant, so that many solutions have been developed for overcoming this tendency of the trawl to close again when the speed increases.

One solution consists in increasing the number of floats. This results in a substantial increase of the drag, influencing the consumption of the ship. In addition, during storage, these floats are very cumbersome, all the more so since they are rolled up with the trawl, and to be able to withstand hard element (chains, cables), they have a tendency to be chosen oversize. Thus, in practice, even for shallow bottoms (50 m), it is floats designed for withstanding 1200 m of depth which are used.

Profiled floats have also been used, such as described particularly in the French patent 1 245 612. These floats combine buoyancy and hydrodynamic operation, allied with reduced drag. However, during storage of the trawl, these floats have the same drawback of being cumbersome as the above floats, even an increased disadvantage because of their larger size.

A particular rigging brings satisfaction in some fishing conditions. In this rigging, named "fork rigging", the front ends of the forks which replace the upper ropes, instead of being fixed to the arms are fixed to the trawl warps, so that when the trawl is fully open, the tractive force on the back rope is substantially horizontal.

However, it is a more complicated mounting than the upper and lower rope rigging. Moreover, it is difficult to adjust and can only be used for shallow bottoms (up to 150 m) with little variation of level. In practice, that means that it can only be used alternately with a conventional rigging (depending on the fishing location), with handling and time consuming requirements at each change.

As for the hydrodynamic operation systems, besides the above mentioned profiled floats, there exist rigid lift panels providing vertical opening of the trawls. They are generally rectangular plates made from wood, light alloy or resin, whose area depends on the power of the trawler. Floats are disposed at the front (leading edge) of the panel, so as to ensure the angle of incidence thereof at the time of lowering into the water. The panel may be fixed on the trawl in two ways: either directly on the back rope, or at a distance therefrom, connected thereto by cables called "tails" and connected to the upper and lower ropes by arms. Although these panels generate a satisfactory vertical force, their instability, particularly during changes of heading, and their difficult adjustment, make them systems which are considered capricious. Furthermore, the fact that they are rigid again forms a hindrance for storing the trawl on the winder.

A flexible version of these panels is also known: it consists of a piece of cloth installed at the level of the back rope and having a portative wing effect. An article entitled "Go fly a kite" in the American review "National Fisherman" of December 1987 deals with this system. It is clear from this article that the rigging of the piece of cloth is fairly sophisticated, which adversely affects the ease of use. Furthermore, a photograph of the system in operation shows a very high curvature of the flexible plane under the effect of the water current, which is certainly very penalizing from the point of view of the hydrodynamic performances.

The aim of the invention is to provide a new and improved hydrodynamic device for causing opening of a trawl, giving satisfaction from the points of view of reliability, performances (the best possible lift/drag ratio), ease of use, size and of course its cost.

The device according to the invention complying with these objects is a structure with at least two superimposed flexible wings, joined together by a plurality of flexible dividing walls which are transverse with respect to said wings, said structure further comprising fixing means for rigging it to the trawl, near the opening, so that the wings are incident with respect to the flow direction, and so that said dividing walls are oriented in the flow direction.

Such a structure is remarkable in that it gives to the flexible shape a stable profile in operation, without requiring rigging which is complicated, so impractical and with the risk of being capricious. When moving, the dividing walls, because of the rigidity which they acquire in the flow direction, define at their level the profile of the wings. By choosing dividing walls which are sufficiently close together, the deformation of the wings can be limited perpendicularly to the flow.

Although the device may be used on the sides of the trawl, so as to have an effect combined with that of the divergent panels, for example for reducing the dimensions thereof, it has been more especially designed for causing vertical opening of the trawl. It is then fixed centrally at the level of the back square. In the case of a large trawl, it is possible to provide secondary devices disposed along the back rope, on each side of the central device. Preferably, the device or devices are disposed as close as possible to the back rope, since it is at the level thereof that the lift effect is required.

In a preferred embodiment of the invention, said structure is a biplane and the dividing walls between the leading edge and the upper wing are spaced evenly apart.

The invention will be better understood from the following explanations, and the accompanying drawings in which:

FIGS. 1 and 2, to which reference has already been made, are respectively a schematic representation of a traditional bottom trawl and a diagram of the forces exerted on the back rope of such a trawl;

Figure 1:
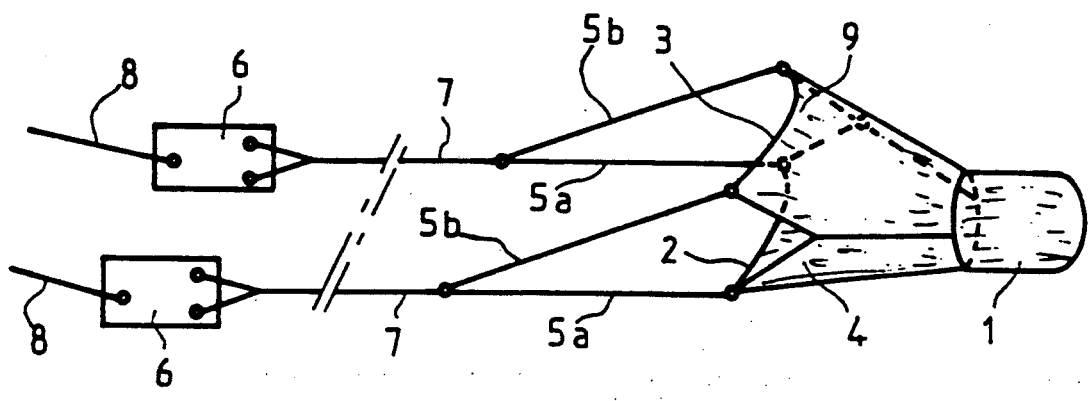
Figure 2:
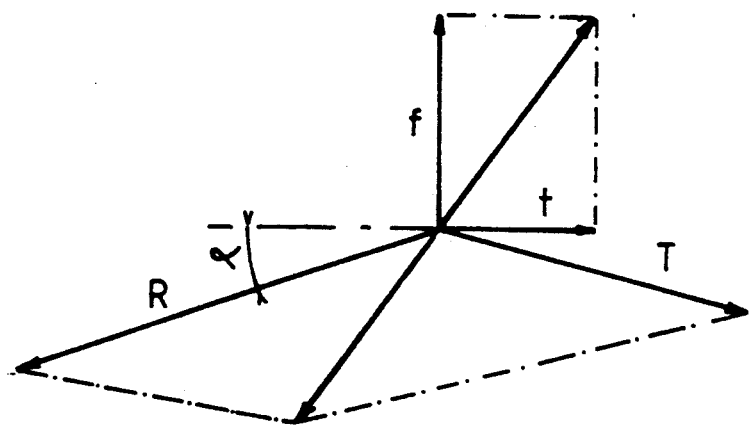
Figure 3:
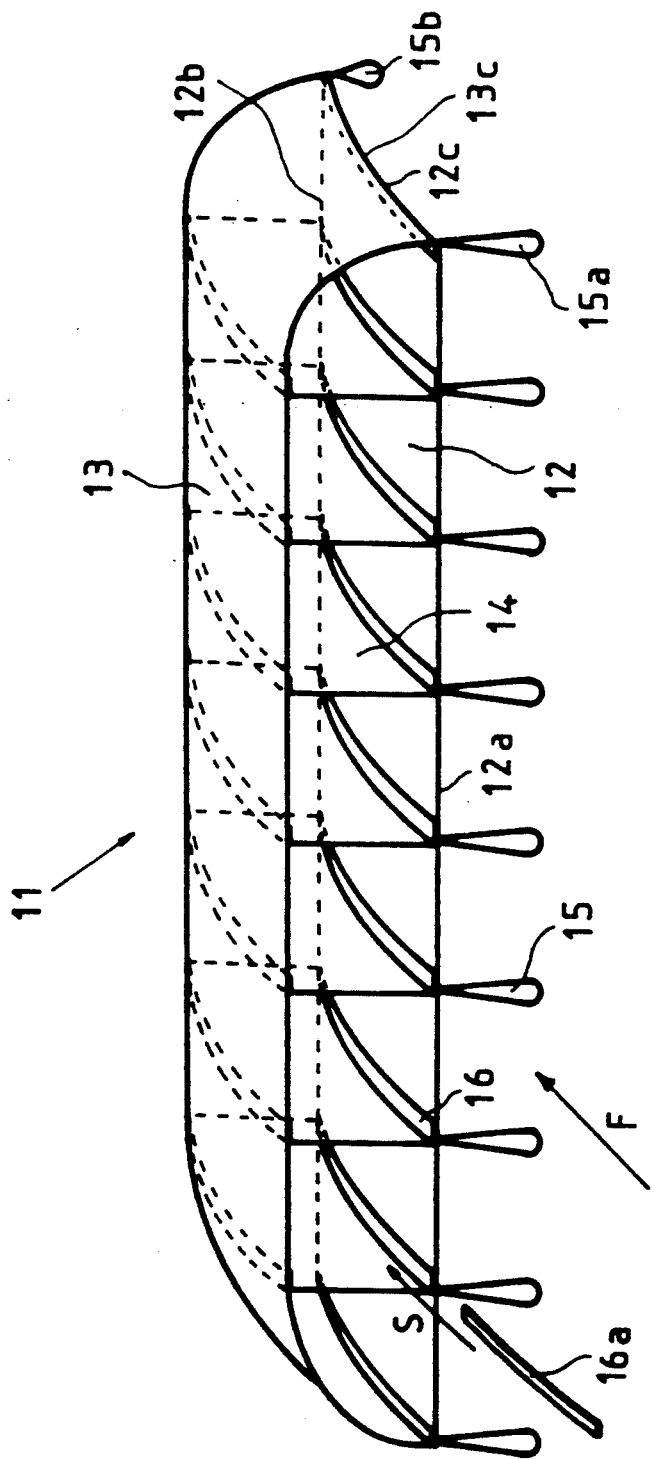
FIG. 3 is a perspective view of a flexible biplane structure according to the invention.

In FIG. 3, the biplane structure 11 according to the invention is shown from the front, i.e. it is intended to operate under the flow conditions shown by arrow F.

The structure 11 comprises a lower wing 12 and an upper wing 13 consisting of two flexible bands joined together at their ends. Between the two wings 12 and 13, dividing walls 14 are provided at even intervals oriented transversely with respect to wings 12 and 13, so, in operation, in the direction F of the flow.

The lower wing 12 has a plurality of attachments 15 for fixing the structure 11 to the trawl, at the desired position, generally the back square. In FIG. 3, attachments 15 comprise front attachments 15a which are situated on the leading edge 12a of wing 12 and attachments 15b which are situated on the trailing edge 12b. At the front and at the rear, attachments 15 are disposed at the level of each transverse dividing wall 14. As shown clearly in the drawings, attachments 15a are longer than attachments 15b, so as to provide a certain angle of incidence of structure 11 with respect to the net portion to which it is fixed It will be noted that said elements 15 may be fixed directly to the back rope for attachments 15a, and even to the meshes of the net for attachments 15b. In a variant, the attachments 15b are fixed to bolt ropes provided for this purpose on the net of the trawl.

In operation, the plurality of attachments 15 confer a substantially rectilinear longitudinal shape on the lower wing 12, so that the biplane automatically takes the shape shown in FIG. 3, namely the shape of adjacent passages with a substantially rectangular section, with end passages whose upper corner is rounded. This embodiment is preferred to a structure comprising end dividing walls, because it generates less turbulence on the sides, and is laterally more stable.

The profile of wings 12 and 13 is obtained by cutting out of dividing walls 14; and at their ends, by cutting out of the sewn edges, such as 12c, 13c.

In the embodiment shown, the two wings 12 and 13 have profiles in the form of concentric arcs of circles, in particular for making sure that their leading edges are substantially tangential to the flow. Furthermore, the pressure forces on the two wings thus radially stretch the crown arc formed by dividing wall 14.

Figure 4:
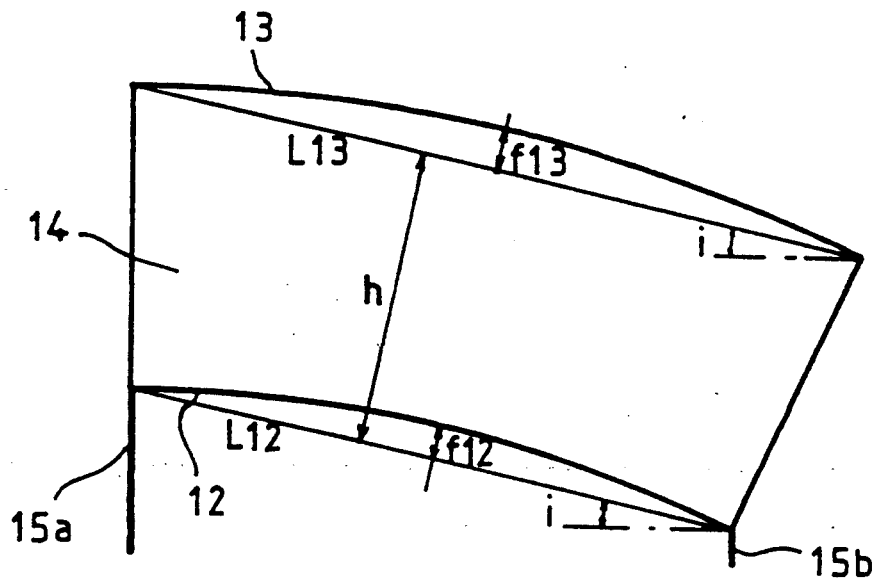
FIG. 4 is a schematic view illustrating the form of a dividing wall of the structure of FIG. 3, as well as the profile of the wings.

In addition, the angles of incidence i of the two wings, namely the inclinations of ropes L12 and L13 in FIG. 4, have been chosen equal and, consequently, the same goes for their curvatures which are equal with ratios f12/L12 and f13/L13. In a satisfactory embodiment, a low camber has been chosen of 0.05, for an extension (ratio between spread and chord) of 5. This curvature, although in theory not being the best performing, has been chosen so as to obtain a stable shape, because it does not disturb the flow too much. Furthermore, the polar curve of such a wing reveals a Cz (lift coefficient) which is very acceptable—greater than 1—for a range of angles of incidence between 9° and 30°, the Cx (drag coefficient) remaining low—less than 0.5—and about 0.2 for an angle of incidence of 12°. Consequently, such characteristics comply well with the conditions of the invention, considering that, for the angle of incidence i of wings 12 and 13, a value of about 12° was chosen. Since the device is intended to be installed on a moving structure (net of the trawl), the real angle of incidence with respect to the flow may be subject to variations. In practice, these variations are however limited, since a trawl has an inertia of form which provides in operation an angle of incidence of the back square with respect to the horizontal between 0°and 10°, depending on the cases. So, in use, the real angle of incidence of wings 12 and 13 will be substantially between 12° and 22°, i.e. within the range of 9° to 30° mentioned above.

The distance between planes or spacing h between chords L12 and L13 has been chosen neither too small, so as to avoid appreciable interaction between the wings, nor too high so as not to adversely affect the stability of shape of the biplane (because of the presence of dividing walls 14 which are too high). In structure 11 of FIG. 3, a relative spacing between planes h/L13 of 0.39 has been chosen, considering then the upper wing.

Of course, other very different biplane profiles may be used according to the invention, in which, for example, an inter-inclination exists between the two wings or else in which the camber of the wings is more marked, even different between the two wings.

In a preferred embodiment, structure 11 has been given a spread of 1.5 m, corresponding approximately to the dimension of the back squares, along the back rope, of the smallest trawls. Such a structure can then be used in all cases. It further offers the possibility of being associated with one or more identical structures on a large trawl, the structures being then mounted side by side along the back rope.

In a variant, several spreads may be considered, corresponding to different trawl sizes Structure 11 has been tested experimentally. For these tests, it was made from a relatively rigid fabric. At the same time, a second structure was tested made from a more flexible fabric and comprising a larger number of dividing walls 14. In both cases, a satisfactory and stable shape was observed from the lowest to the highest speeds, for a normal angle of incidence of 12° with respect to the flow. Another test was carried out with an angle of incidence reduced to a very low value, namely 3°. Although the leading edges of the wings are then no longer parallel to the flow, the shape proved satisfactory and stable from the lowest to the highest speeds. From this observation, it may be deduced that the structure of the invention is not only capable of working under very unfavourable conditions, but further a minimum angle of incidence causes opening thereof, then stability thereof from the beginning of the flow. In addition, changes of direction have been simulated by disposing the structure obliquely with respect to the flow: the structure remains sufficiently shaped so as to be able to resume again its original operation after the manoeuvre.

On the other hand, it was noted during all these tests that, although the upper wing 13 had a very even curvature, it was not the same for the lower wing 12 which had a marked curvature in the rear third, the phenomenon being noticeable for the flexible fabric structure.

As for the quantitative analysis, it revealed a higher drag for the more flexible fabric structure, justified by reinforcing the friction resistance due to the multiplicity of dividing walls 14, and by the more marked curvature of the lower wing 12. This structure also has a lower lift coefficient Cz, because of the "little lift" trend taken by the lower wing.

In order to limit the deformation of the lower wing 12, it was made locally more rigid at the level of the dividing walls, for example by means of small slats 16a (only one of which is shown in this figure) slid, as shown by arrow S, into sleeves 16, FIG. 3, formed by the sewing joining together the lower wing 12 and dividing walls 14. Thus equipped, the lower wing 12 has then a regular curvature conforming to theory, as well as the upper wing 13.

Figure 6:
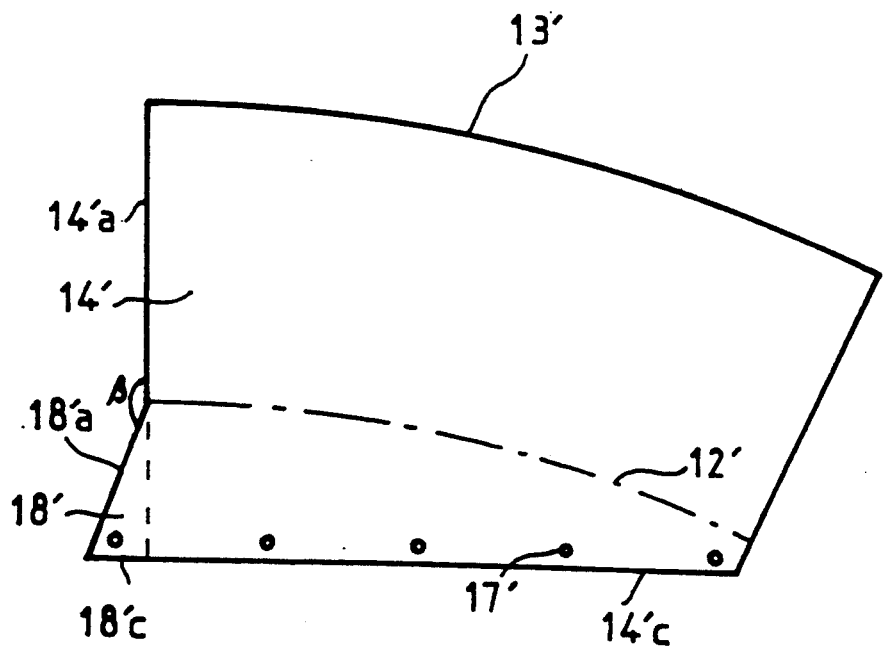
FIG. 6 is a view equivalent to FIG. 4, and referring to the structure of FIG. 5.
Figure 5:
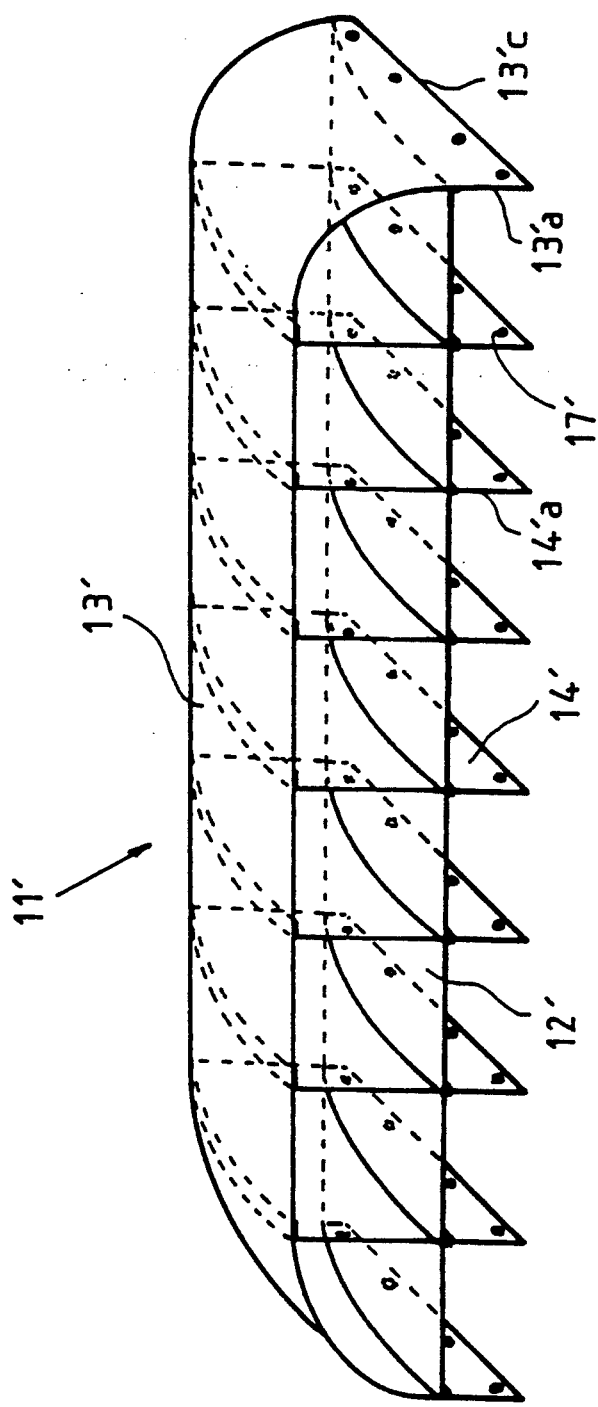
FIG. 5 is a perspective view of a variant of the biplane structure of FIG. 3.

The structure 11' of FIG. 5 differs from structure 1 of FIG. 3 only by its dividing walls 14' which are extended below the lower wing 12', as illustrated in FIG. 6, and by the lateral ends of the upper wing 13', similarly extended beyond the junction with the lower wing 12'. The lower sides 14'c of dividing walls 14' and the lateral sides 13'c of the upper wing 13' are rectilinear and they form respectively with the front side 14'a and the front edge 13'a an angle of about 90°. A series of eyelets 17', aligned along sides 14'c and sides 13'c, allow the structure 11' to be fixed all along the lower sides 14'c of dividing walls 14' and ends 13'c of the upper wing, on the net of the trawl, on the mesh or on the bolt ropes. In operation, the lower sides 14'c and 13'c are therefore held rectilinearly by the net, so that neither the profile of the sewing with the lower wing 12' nor, consequently, the very profile of wing 12' is likely to be deformed. In this embodiment, the particular shape and rigging of dividing walls 14' and of the ends of wing 13' replace said slats.

Dividing walls 14' are preferably cut out so as to have an extended portion 18' in their lower front corner, in which an eyelet 17' is fitted. Offsetting the fixing points forward with respect to the structure avoids the recoil of the latter under the effect of the flow and, consequently, deformation of the base of the dividing wall 14' which results therefrom. In the example shown, portion 18' is triangular, with its lower side 18'c extending the lower side 14'c and its front side 18a forming an angle $\beta$ of about 160° with the side 14'a at the level of the leading edge of the lower wing 12'. In a variant, portion 18' is replaced by attachments such as attachment 15a of FIG. 4, intended to be fixed to the trawl in front of the dividing walls 14'. Preferably, the portions of the upper wing 13' beyond the lower wing 12' are adapted in the same way as dividing walls 14'.

These structural versions according to the invention, with slats or with extended dividing walls fixed along their lower edge, make it possible to use a relatively flexible material, preferable to a material which is too thick, difficult to put into shape and reinforcing the drag. Appropriate materials are, for example, a PVC or rubber coated fabric, or polyester cloths of sailcloth type. Furthermore, for a structure of a spread of 1.5 m, the number of dividing walls is preferably between 8 and 12.

Figure 7:
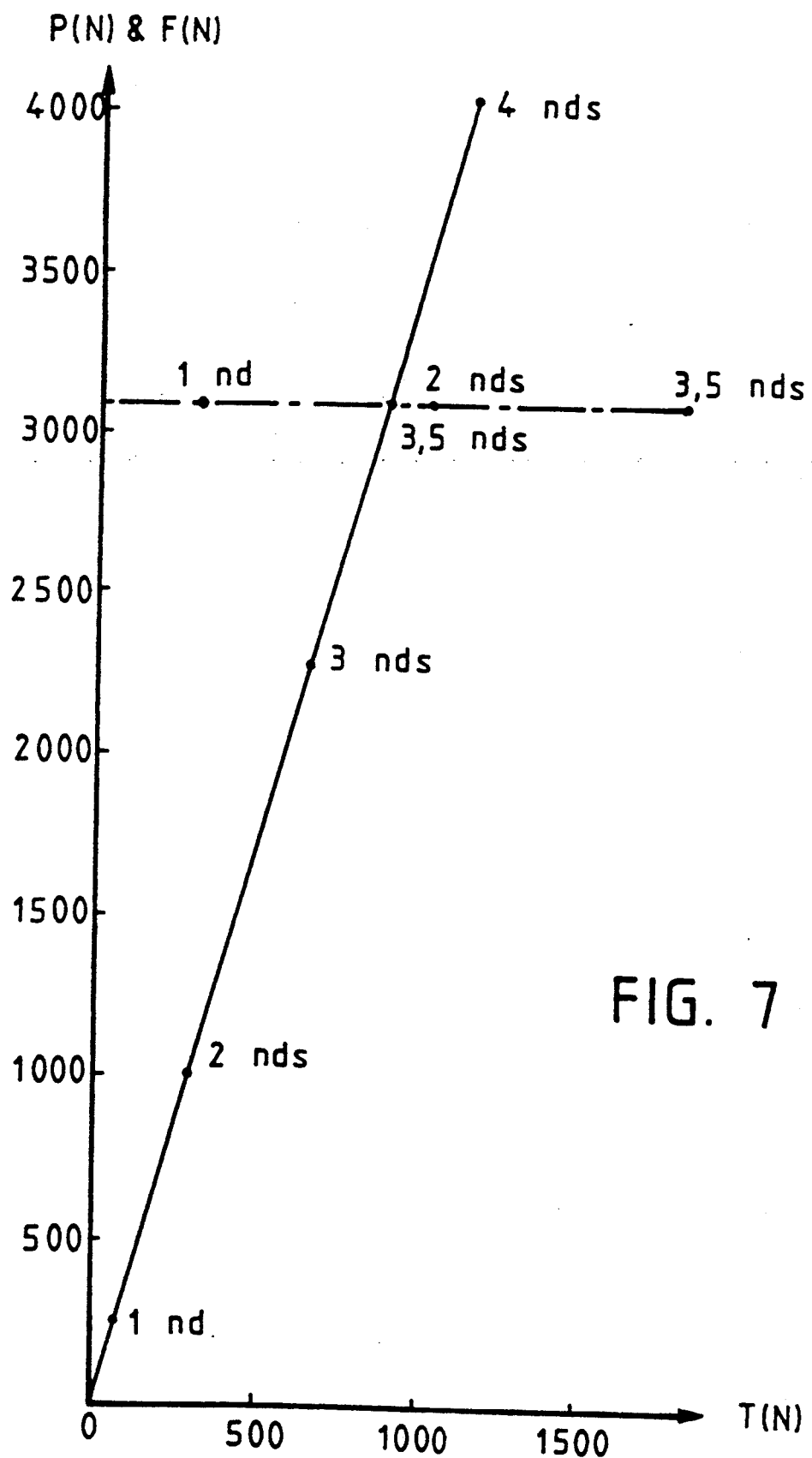
FIG. 7 is a graph on which the performances of a device according to the invention and those of a conventional system are compared.

The graph of FIG. 7 shows a comparison between a device according to the invention (1.5 m spread) and a system with floats spaced apart along the back rope. The drag T(N) is plotted as abscissa and the lift P(N) or buoyancy F(N) as ordinates. The continuous straight line shows the device of the invention, and the discontinuous line shows the float system. At 3.5 knots (mean trawling speed), the biplane according to the invention exerts a lift estimated at 3120 N, i.e. the vertical force of about 104×41 floats of the most widely used type. It will be noted that for the same lift, the drag of the biplane is only half that of the floats. Another criterion of comparison is particularly eloquent: the space required. 104 floats occupy 20 m of back rope, against 1.5 m spread of the biplane. At 4 knots, the lift of the biplane exceeds 4000 N, for a drag which is hardly increased. It should be noted that the lift increases with the square of the speed.

In practice, the device of the invention is further optimized by the presence of some small floats attached along the leading edge of its upper wing and intended to provide opening of the biplane, whatever the configuration it had at the outset. Furthermore, in the case of a sudden change of direction, if the trawl is momentarily immobilized, these floats maintain the biplane open, which is thus favourably predisposed for starting up again.

To conclude, the flexible structure according to the invention shows a quite interesting potential, from the point of view of its performances first of all, but also it reliability, its cost and its advantages in use: ease of rigging and space required which may be considered as zero. Moreover, although its application to bottom trawls has been more particularly considered here, it is possible to use it for all types of trawl, such as pelagic trawls, twin trawls, etc.

We claim:

1. Hydrodynamic trawl opening device comprising a structure with at least two flexible superimposed wings, joined together by a plurality of flexible dividing walls which are transverse to said wings, fixing means for rigging said structure to the trawl, close to an opening of the trawl, so that the wings are incident with respect to the flow direction and so that said dividing walls are oriented in the flow direction, said flexible wings and said flexible dividing walls being made of fabric, so that said structure is collapsed out of the water but takes shape in the water to provide a rigid opening device when trawled.

2. Device according to claim 1, characterized in that said structure is a biplane and in that the dividing walls (14 or 14') between the lower wing (12 or 12') and the upper wing (13 or 13') are spaced evenly apart.

3. Device according to claim 2, characterized in that the profiles of the lower wing (12 or 12') and the upper wing (13 or 13') are portions of concentric arcs of circles and in that the fixing means are such that, in operation, the leading edges of said wings are substantially tangential to the flow.

4. Device according to claim 2 or 3, characterized in that the lower and upper wings (12 and 13 or 12' and 13') have the same angle of incidence.

5. Device according to claim 2 or 3, characterized in that a ratio of the chambers of the lower and upper wings (12 and 13) respectively equal to f12/L12, f13/L13, are approximately 0.05.

6. Hydrodynamic trawl opening device comprising a structure with at least two flexible superimposed wings, joined together by a plurality of flexible dividing walls which are transverse to said wings, fixing means for rigging said structure to the trawl, close to an opening of the trawl, so that the wings are incident with respect to the flow direction and so that said dividing walls are oriented in the flow direction, and the device being stably and rigidly formed in the water by trawling displacement, wherein said structure is a biplane and in that the dividing walls (14 or 14') between the lower wing (12 or 12') and the upper wing (13 or 13') are spaced evenly apart, and wherein the lower (12 or 12') and upper (13 or 13') wings are joined together at the ends of the lower wing so as to confer a rounded shape on the ends of the structure (11 or 11').

7. Device according to claim 2 or 3 characterized in that it has a spread of about 1.5 m and an extension of about 5.

8. Device according to one of claims 1 to 3, characterized in that said fixing means comprise attachments (15) including forward attachments (15a) under the leading edge (12a) of the lower wing (12) and trailing attachments (15b) on the lower wing trailing edge (12b), the attachments (15) being moreover in line with the dividing walls (14).

9. Device according to one of claim 1 to 3 further comprising slats at the level of the connections between the dividing walls (14) and the lower wing (12).

10. Hydrodynamic trawl opening device comprising a structure with at least two flexible superimposed wings, joined together by a plurality of flexible dividing walls which are transverse to said wings, fixing means for rigging said structure to the trawl, close to an opening of the trawl, so that the wings are incident with respect to the flow direction and so that said dividing walls are oriented in the flow direction, and the device being stably and rigidly formed in the water by trawling displacement, and wherein the dividing walls (14') and the ends of the wing (13') are extended beyond the lower wing (12), the lower sides (14'c) of the dividing walls (14') and the sides (13'c) of the upper wing (13') being provided with means for fixing them to the net of the trawl over the whole of their length.

11. Device according to claim 10, further comprising means for connecting the leading edge of the lower wing (12') at points of the trawl offset towards the front.

12. Device according to claim 11, wherein said means for connecting comprises an extended portion (18') in the lower front corner of the dividing walls (14'), and on which a fixing means (17') is mounted.

13. Device according to one of claims 1 or 3, characterized in that the wings and the dividing walls are made from a coated fabric.

14. Device according to one of claims 1 to 3, characterized in that the wings and the dividing walls are made from a polyester cloth of the sailcloth type.

15. Device according to one of claims 1 to 3, characterized in that the upper wing (13 or 13') is provided with floats, fixed along its front edge.

16. Hydrodynamic trawl opening device comprising a structure with at least two flexible superimposed wings, joined together by a plurality of flexible dividing walls which are transverse with respect to said wings, fixing means for rigging said structure to the trawl, close to an opening of the trawl, so that the wings are incident with respect to the flow direction and so that said dividing walls are oriented in the flow direction, said structure being a biplane, and the dividing walls (14 or 14') between the lower wing (12 or 12') and the upper wing (13 or 13') being spaced evenly apart, the profiles of the lower wing (12 or 12') and the upper wing (13 or 13') are portions of concentric arcs of circles and in that the fixing means are such that in operation the leading edges of said wings are substantially tangential to the flow, the lower and upper wings (12 and 13 or 23' and 13') have the same angle of incidence, and have cambers, the lower (12 or 12') and upper (13 or 13') wings are joined together at the ends of the lower wing so as to confer a rounded shape on the ends of the structure (11 or 11'), said fixing means include attachments leading attachments (15a) under the leading edge (12a) of the lower wing (12) and trawling attachments (15b) on the lower trailing edge (12b), the attachments (15) being in line with the dividing walls (14), the wings and the dividing walls are made from a coated fabric from a polyester cloth of the sailcloth type.

* * * * *